Figures 1, 8, 9, 10, 11:
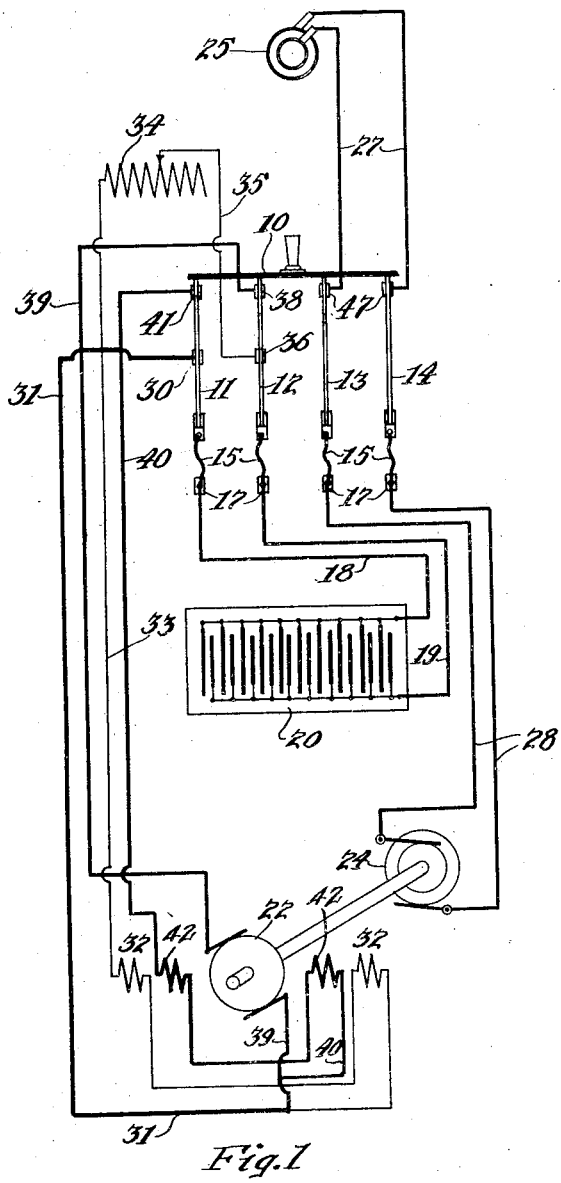

J. F. LINCOLN.
CHARGING SYSTEM FOR STORAGE BATTERIES.
APPLICATION FILED SEPT. 19, 1914.

1,260,218.

Patented Mar. 19, 1918.
2 SHEETS—SHEET 1.

Witnesses
Archer P. Richards
Justin D. Macklin

Inventor
James F. Lincoln,
By Albert H. Baker, Atty

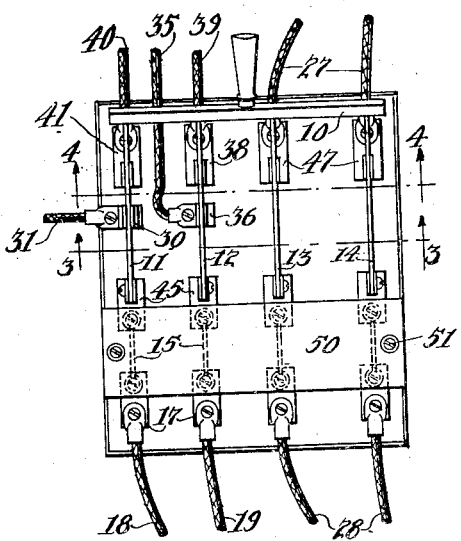
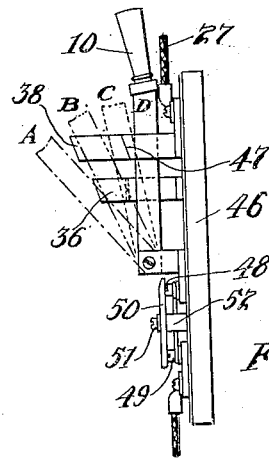
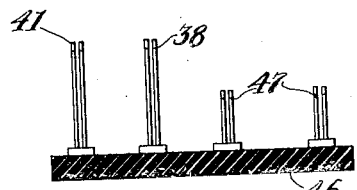
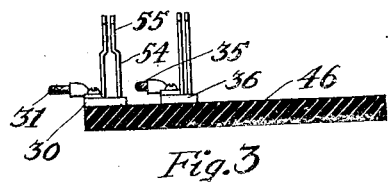
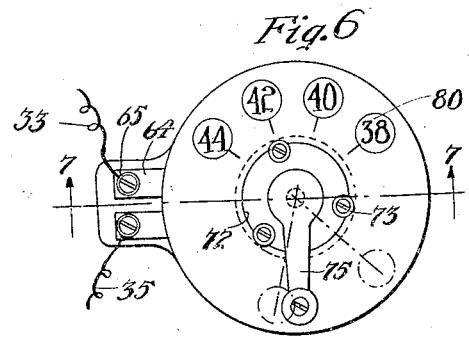
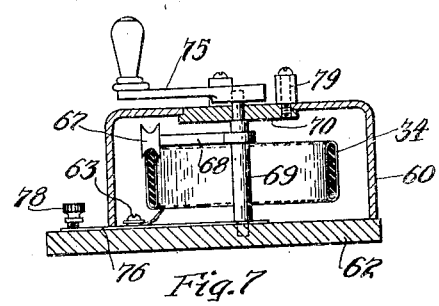

UNITED STATES PATENT OFFICE.

JAMES F. LINCOLN, OF CLEVELAND, OHIO, ASSIGNOR TO THE LINCOLN ELECTRIC COMPANY, OF CLEVELAND, OHIO, A CORPORATION OF OHIO.

CHARGING SYSTEM FOR STORAGE BATTERIES.

1,260,218.  Specification of Letters Patent.  Patented Mar. 19, 1918.

Application filed September 19, 1914. Serial No. 862,600.

*To all whom it may concern:*

Be it known that I, JAMES F. LINCOLN, a citizen of the United States, residing at Cleveland, in the county of Cuyahoga and State of Ohio, have invented a certain new and useful Improvement in Charging Systems for Storage Batteries, of which the following is a full, clear, and exact description, reference being had to the accompanying drawings.

This invention relates to motor generator sets and controlling devices for charging storage batteries by power derived from alternating current. One of the objects of the invention is to provide such an equipment in a form which shall be most efficient in operation and entirely automatic when the connection to the battery is made, so that the system may be conveniently employed in charging the batteries.

Another object is to so arrange the device that I may use a compound wound generator for charging the battery, thereby providing the most efficient use of the power driving such generator and insuring against overcharging the battery at a high rate. Excessive overcharging is prevented by arranging the circuits through the fields of the generator so that the current to the battery will gradually be tapered off as it becomes charged. Another object is to provide a simple switching mechanism so arranged in the circuits of the system that only one movement of this switch is required to begin the charging operation. Still another object of the invention is to provide a simple regulating means for controlling the current through the field of the generator so that it may be adjusted for cars having different numbers of cells to give the most efficient result in each case.

A feature of my invention is that when in operation, if the power driving the generator (the current through the alternating current motor) is for any reason temporarily shut off, the motor generator set will continue to be driven at its normal speed by the current in the battery and when such power is again turned on, the charging is automatically resumed.

In the drawings Figure 1 is a wiring diagram showing the controlling switch board and arrangement of circuits in my charging system; Fig. 2 is a front elevation of the switch proper; Fig. 3 is a cross section of the switch looking upwardly on the line 3—3 of Fig. 2; Fig. 4 is a second cross section, looking upwardly on the line 4—4 of Fig. 2; Fig. 5 is a side elevation of the switch indicating in broken lines the four positions of the switch blade, in each of which different circuits are closed; Fig. 6 is a plan of an adjustable rheostat by which the current may be varied for charging batteries of different numbers of cells, and Fig. 7 is a vertical cross section of the same substantially on the line 7—7 of Fig. 6. Figs. 8, 9, 10 and 11 inclusive, are diagrams indicating the four sets of connections successively made by the blades of the main switch as it is moved into position to begin the charging.

Referring first to the general arrangement of circuits as shown in the diagram in Fig. 1; 10 indicates a main switch having the usual yoke bar of insulating material carried on the ends of the four switch blades 11, 12, 13 and 14, each pivoted at their lower ends to suitable connections, to which lead fuses 15, each extending to suitable binding posts 17. Leading from the posts 17, connected to the blades 11 and 12, are the battery wires 18 and 19, connected with battery indicated at 20. 22 indicates a compound wound generator directly connected with an alternating current motor 24. The motor 24 is shown as connected with a source of alternating current 25, through wires 27, the switch blades 13 and 14 and wires 28.

Referring now to the connections and circuits for the compound wound generator; leading from a terminal 36 adapted to engage the blade 12 of the main switch, is a line 35 leading to a variable resistance indicated at 34, then through a line 33 through the shunt windings 32 and a line 31 to a terminal 30 engaging the switch blade 11. When the blades 11 and 12 are in engagement with the terminals 36 and 30, current from the battery 20 may flow through the lines 18 and 19 and the circuits just described, through the shunt field of the generator. From a terminal 38 adapted to engage the switch blade 12, is a line 39 leading through the armature of the generator 22 and through the line 31, to the terminal 30. The series winding 42 of the generator is in circuit with a line 40 leading from a terminal 41, engaging the switch blade 11, to the line 31. Thus the series field and line 31 are in parallel from the battery line 18 and the blade 11 and line 31 form a bridge or shunt across the series field when the connection at 30 is made.

By means of the circuits described, I start the apparatus by passing current first through the shunt field of the generator alone, to saturate that field and enable a low battery current to start the armature; second through the shunt field and armature together, thereby rotating the generator as a motor by means of the residual current in the battery 20. When the armature reaches substantially its normal speed, I pass (third) the alternating current through motor 24 changing the direct current machine to a shunt-wound generator, beginning the charging. Finally (fourth) I cut out the bride across the series field converting the generator to a compound wound machine.

To most simply accomplish these four steps in starting, I have provided a switch which, as it is moved inwardly connects the circuits successively in the manner just referred to and hereinafter more fully described.

This switch is shown particularly in Figs. 2 to 5 inclusive. The terminals 45 pivotally carrying the switch blade, are suitably mounted on a switch board or base 46 of slate or like material, carrying the terminals 17, heretofore mentioned and also carrying the terminals 30, 36, 38 and 41 described. The terminals 47, to which the wires 27 are secured, adapted to engage the blades 13 and 14, are also mounted on this base 46. Their terminals 45 and 17 are provided with suitable binding posts or screws 48 and 49 respectively, for securing the fuses 15. These fuses and binding screws are preferably covered by a cross plate 50, secured to the base by screws 51 extending through insulating distance pieces 52.

In order that the circuits of my system will be closed in their proper order as the switch is moved inwardly toward the base to start the charging operation, I construct the terminals 30 and 36 of such a height that the switch blades 11 and 12 first contact at their intermediate parts with these terminals when the switch is brought to the position indicated in broken lines at A in Fig. 5. As the switch blades swing inwardly, these blades 11 and 12 next (second) engage the terminals 38 and 41 when in the position shown in broken lines at B, Fig. 5. In the third position indicated at C, in broken lines, the switch still engages each of the terminals mentioned and also the terminals 47 of the alternating current line. The last portion of the movement of the switch brings it to the fourth position shown in solid lines at D, Fig. 5. The blades of the switch are each in engagement with their respective terminals, with the exception of the terminal 30, which has its contact members separated as at 54, below the contact portion 55, which the blade 11 engages on its first movement. This spread or separated portion 54 causes these members to be out of contact with the blade 11 when the switch is in its final position.

Now as the switch is moved inwardly to start the charging, the circuits of my system are connected in the following order: The blades 11 and 12 first engage the terminals 30 and 36, closing the circuit from the battery 20 through the wires 18 and 19, through the wire 31 and the shunt windings 32 of the generator, through the variable resistance 34 and the wire 35, saturating the shunt field of the generator, and a further movement of the switch blades 11 and 12 next (second) engage the terminals 38 and 41 directing a portion of the residual current through the armature of the generator, passing through the wires 39 and 31, thereby temporarily running the generator as a motor and starting the motor 24, bringing the same substantially to its normal speed. The two positions of the switches just described are indicated diagrammatically in Figs. 8 and 9 respectively. A further movement of the switch next (third) connects the blades 13 and 14 with the terminals 47, thereby directing alternating current through the motor 24.

It will be noted that with the switch in the position indicated in broken lines at C, Fig. 5, a current is still being directed through the shunt field and armature of the motor generator from the battery until after the alternating current is directed through the motor 24. This insures the starting of the set without diminution of the speed. It will be noted that in this position (C) the line 31 forms a bridge across the series field, preventing the excitation of this field until the further movement of the switch which cuts out this bridge by bringing the blade 11 into the separated portion 54 of the terminal 30, as described. In this position the connections are formed as shown diagrammatically in Fig. 11, in which the motor is being driven by the alternating current and the generator 22 is now a compound-wound machine connected with the battery in such a manner as to charge the same.

While the generator continues to be driven by the motor the battery is being charged by the current generated. It will be noted that, as the battery becomes charged and its voltage rises because of its charge, that the current supplied by the generator will diminish. This current will be further diminished by reason of less excitation from the series field due to the decrease of current in the series field. Accordingly, when a battery becomes entirely charged there will be practically no current flowing through the series field, and thus the amount of current flowing at such time into the battery will be so small that it may be continued indefinitely without harm to the battery.

To regulate the resistance of the shunt field so that the charging current may be suitable for various numbers of cells, I have provided the variable resistance indicated at 34, shown more particularly in Figs. 6 and 7. The resistance coil 34 is preferably wound on a ring of insulating material mounted inside a casing 60 carried by a base 62 adapted to be mounted in a suitable switch box, not shown. One end of the resistance wire leads to a screw 63 connected with a strip 64 provided with a binding screw 65, to which is connected the line 63. The variable contact is preferably in the form of a grooved roller 67 carried on an arm 68 mounted on a rotatable shaft 69, having a bearing in an adjustable disk 70, carried by the upper portion of the casing 60, and having a bearing in the base 62. The disk is shown as circular and having a laterally projecting annular flange engaging beneath the edge of a circular opening 72 formed in the top of the casing and is secured in place by means of suitable screws 73, extending through distance pieces or buttons 79.

A small crank 75 on the upper end of the shaft provides for oscillating the arm 76 to change the position of the rider on the resistance coil. The lower end of this shaft is electrically connected with a strip 76 leading to a binding post 78, to which the wire 35 is connected. The buttons 79 form abutments for the crank 75, limiting its oscillating movement. The disk carrying these screws may be adjusted by rotating to bring the position of the crank and arm 78 into different relation with the resistance coil, for different numbers of cells in the batteries to be charged. Suitable graduations, as indicated at 80, in the upper surface of the casing 60, may be provided to indicate the proper position for certain numbers of cells.

It will be seen from the foregoing description that I have provided with a motor generator set, an arrangement of switch and circuit apparatus whereby when the switch is moved inwardly to begin the operation, it automatically starts the motor generator set by the residual current in the battery, and then starts the motor to drive the same. It will also be seen that I have provided a system in which I may use a compound-wound generator which is not only very efficient in its operation for charging batteries, but enables the using voltage of the battery, as it becomes charged, to taper off the charging current, thereby eliminating the danger of excessive overcharging and obviating the necessity of a throw-out mechanism, heretofore commonly used. It will be seen that with my system that when the batteries become fully charged, practically no current will be passing through the series field of the generator, and the generator set will run idly, using but very little of the alternating current. Thus the charging device does not require close attention.

The series field windings of my compound-wound generator may be either cumulative or differential with reference to the shunt windings, according to the kind of current preferred. For charging a lead battery I prefer a cumulative winding, giving a constant potential; while for charging an Edison battery, the winding is preferably differential, giving a constant current.

An advantage in using a compound-wound generator is that the addition of the series field makes the starting rate considerably higher than is possible with a shunt-wound machine of the same size, and this enables the charging to be accomplished in a much shorter time. This is of especial importance in charging batteries for vehicles, where it is frequently desired to return the vehicle to active service as soon as possible.

It will also be noted that by this arrangement in case of a failure of the alternating current, the generator set continues to rotate, taking a small current from the battery, and on the voltage being restored through the motor, the generator again resumes its normal operation and continues the charge.

The arrangement above described allows the charging plug or connection to the battery to be connected either way, i. e., one of the connections to either positive or negative terminal and vice versa, and the outfit will automatically build up in proper direction and charge in the direction proper under the conditions thus established.

Having thus described my invention, what I claim is:

1. In a storage battery charging system, the combination of a direct current compound-wound generator, an alternating current motor for driving the generator, a conductor adapted to form a bridge across the series winding of the generator, and means for directing the battery current to the generator to drive it as a shunt-wound motor to speed up the idle alternating current motor and for then connecting a source of alternating current with the alternating current motor to drive the direct current machine as a shunt wound generator, and for thereafter opening such bridge line while the shunt is in circuit to make the direct current machine a compound-wound generator.

2. In a storage battery charging system, the combination with the battery, of a compound-wound generator, conductors adapted to connect them, an alternating current motor, conductors leading thereto, and a multi-pole switch in said conductors adapted when moved to operative position to direct the battery current through the shunt field of the generator, thereafter close the A. C. circuit through the motor, and thereafter form the effective D. C. circuit through both the shunt and series field winding of the generator.

3. In a storage battery charging system, the combination with the battery, of a compound-wound generator having shunt and series fields, conductors between the battery and the fields and armature of the generator including a bridge line across the series field, a source of alternating current, an alternating current motor, and conductors between them, and switching mechanism in the circuits provided by such conductors adapted to direct battery current through the shunt field and armature, thereafter direct the A. C. current through said motor, and thereafter break the circuit through the bridge across the series field of the generator.

4. In a storage battery charging system, the combination with the storage battery and a source of alternating current, of a motor generator set comprising a compound-wound generator and an alternating current motor, conductors from the source of alternating current to the motor, conductors from the battery to the generator, including circuits through the shunt field, series field and armature, and a bridge circuit adapted when closed to short-circuit the series field, and a multi-pole switch for the conductors adapted when moved to operative position to direct current first through the shunt field, next through the armature also, then close the circuit through the motor, and then open the bridge circuit.

5. In a storage battery charging system, the combination with the battery and a source of alternating current, of a compound-wound generator and an alternating current motor directly connected, conductors between the motor and the source of alternating current, conductors between the armature, shunt and series fields of the generator and the battery, a multi-pole switch in said conductors, a variable resistance in the conductor through the shunt winding, and a bridge line leading from the battery in parallel with the series winding, said switch being arranged to start the motor generator, thereafter closing the circuit through the A. C. motor and then breaking the circuit through the bridge line.

6. In a charging system for storage batteries, the combination with the battery and a motor generator, the generator being compound-wound, of a multi-pole switch, conductors from the battery to two poles of the switch, a line from one pole of the switch through the armature, a second line from the same pole in parallel with the first mentioned line through the shunt-winding, a return from said lines leading to the other pole of the switch connected to the battery, said switch being formed to direct battery current through the shunt winding and through the armature successively, a third line connected with the same pole of the switch as the return for the shunt and armature and leading through the series winding and connected with the shunt and armature lines, said switch being adapted when in charging position to be disconnected from the return line mentioned, thereby allowing the generator to operate as a compound-wound machine.

7. In a storage battery charging system, the combination with the battery and a source of alternating current, of a compound-wound generator, an alternating current motor directly connected therewith, a four-pole switch having two blades for closing the circuit through the alternating current motor, conductors from the battery to two other blades of the switch, conductors from these latter blades through the fields and armature of the generator, a bridge circuit in parallel with the series winding of the generator, terminals for said switch blades so arranged that as the switch is thrown to operative position the generator is first operated as a shunt wound motor, after which the circuit through the alternating current motor is closed, after which the bridge line is broken, converting the motor from a shunt-wound machine to a compound-wound generator.

8. In a storage battery charging system, a motor generator having an alternating current motor coupled with a dynamo which is interchangeably compound-wound or shunt-wound combined with a multi-pole switch and circuits adapted to connect the dynamo as a shunt-wound motor with the battery to speed up the alternating current motor and thereafter to connect the dynamo as a compound-wound machine whereby it becomes a compound-wound generator.

In testimony whereof, I hereunto affix my signature in the presence of two witnesses.

J. F. LINCOLN.

Witnesses:
ROBT. E. KINKEAD,
I. W. DANFORTH.